3,226,409
TETRAALKYLLEAD PROCESS
Francis M. Beaird, Jr., and Paul Kobetz, Baton Rouge, La., assignors to Ethyl Corporation, New York, N.Y., a corporation of Virginia
No Drawing. Filed Oct. 22, 1963, Ser. No. 318,081
6 Claims. (Cl. 260—437)

This invention relates to a new and improved process for the catalyzed synthesis of a tetramethyllead product.

It is known that the tetraalkyllead compounds can be made, generally, by the reaction of an alkali metal lead alloy and an alkyl halide, such as a mono sodium lead alloy, NaPb, and an alkyl chloride. The reaction for tetraethyllead is

$$4NaPb + 4C_2H_5Cl \rightarrow (C_2H_5)_4Pb + 3Pb + 4NaCl$$

This type of synthesis reaction has been employed for an appreciable period for making large amounts of tetraethyllead. The chemical reaction is operative for other tetraalkylleads, and recently considerable interest has developed in the manufacture and use of tetramethyllead, an appreciably more volatile lead antiknock compound.

The indicated chemical reaction, applied to the manufacture of tetramethyllead is operative, but only very low yields are obtained without a catalyst. Also, a tetramethyllead process presents more drastic control requirements, and requires more rigorous control than the corresponding type of synthesis of tetraethyllead, because of the substantially higher vapor pressure of tetramethyllead and of the methyl chloride used in its synthesis. A substantially improved procedure for the synthesis of tetramethyllead is disclosed in U.S. Patent 3,049,558 by Cook et al. According to the Cook et al. process, a controlled quantity of a class of inert liquid hydrocarbons, provides, in the presence of a catalyst, appreciably greater yields than are achieved when no inert hydrocarbon is present. The hydrocarbons generally are those having an atmospheric boiling point of about 90–150° C. and these are employed in relatively small concentrations based on the lead in the alloy charged. Aluminum type catalysts are highly effective catalysts.

According to the Cook et al. process, yields of the order of 60–75 percent can be obtained, in reaction periods of less than about seven hours.

A problem encountered in tetramethyllead synthesis is frequent difficulty in discharge of reaction mass from commercial scale autoclaves. By reaction mass is meant the mixture of materials present in a reaction zone or autoclave at the termination of reaction, which mixture includes the aforementioned subdivided lead, the tetramethyllead product, alkali metal chloride, minor amounts of non-reacted chloride, and trace impurities or additives. Also present in the reaction mass, is the inert hydrocarbon customarily employed. The major component of the reaction mass is subdivided lead, owing to the above mentioned stoichiometry of the synthesis reaction. The reaction mass resembles a granular mixture and is discharged from autoclaves by rotation of agitator devices having plow elements for transport of the reaction mass to a discharge nozzle or valve. In the course of commercial operations, considerable difficulty has frequently been encountered in this respect. Another difficulty has arisen from the fact that, after using aluminum containing catalysts, apparently the reaction mass also contains a residual amount of active alkyl-aluminum component which is quite susceptible to oxidation or other reaction. This is manifested by fuming or smoking of the reaction mass when exposed to gaseous atmospheres, even when such atmospheres are relatively free of oxygen. Such fuming necessitates the extensive use of particularly pure insert gas to partly alleviate the problem. The fuming or smoking is especially disadvantageous in that such fumes appear to deposit solids in subsequent heat exchanger equipment, which significantly fouls and reduces the capacity of such equipment. Apparently even commercial gases considered sufficiently pure to be classed "inert" included impurities of a fume initiating or inducing type.

The general object of the present invention is to provide a new and novel process for the effective and economical synthesis of tetramethyllead. Another object is to provide reaction masses, or reaction mixtures, which are facile with respect to physical handling and with respect to avoidance of fumes which are disadvantageous to processing. Another object is to provide a tetramethyllead synthesis process employing as catalysts a two component system, i.e., having provided to the reaction members of two different classes of additives as hereafter described.

The present invention comprises reacting a sodium lead alloy and methyl chloride to produce tetramethyllead, catalyzed by providing a binary system supplied by adding to the reaction system an alkyl aluminum compound and an alcoholate of a lower alkyl ether of a lower ethylene glycol. The proportions of the two catalyst additives in this class of embodiments can be widely varied, but will usually be in the proportions of from as low as 0.05 to 2.0 atom equivalent of the electropositive metal or metalloid element of the alkoxide component per gram atom of aluminum in the alkyl aluminum catalyst. The alkyl aluminum component is provided in proportions providing from as low as 0.04 to as high as 0.5 weight percent aluminum based on the alloy, a concentration of 0.1 to 0.3 weight percent being much preferred.

The aluminum alkyl catalysts are the organic metallic aluminum compounds having at least one alkyl group per atom of aluminum. Illustrative members of such group of catalysts, when used, include aluminum trialkyls such as trimethyl aluminum, triethyl aluminum, tri-n-propyl aluminum, tri-n-butyl aluminum, tri-isobutyl aluminum, and diethyl-n-butyl aluminum; alkyl aluminum sesquichlorides such as ethyl aluminum sesquichloride, $(C_2H_5)_3Al_2Cl_3$, methyl aluminum sesquichloride, and others of similar nature. Dialkyl aluminum chlorides, such as diethyl aluminum chloride, are quite suitable. The dialkyl aluminum hydrides such as diethyl aluminum hydride can be employed in certain instances. Aluminum alkyl catalysts can be generated in situ by the reaction of the methyl chloride employed as a reactant with an aluminum inorganic compound, such as aluminum trichloride, or even with aluminum metal itself, although these embodiments are not highly desirable. Generally, lower alkyl compounds are preferred, i.e. with alkyl radicals having up to about 10 carbon atoms, though higher alkyl groups will not destroy the effectiveness of the aluminum component.

As already stated, catalysis is provided by also adding as second components alcoholate compounds of lower alkyl ethers of lower polyethylene glycols. By lower ethylene glycols is meant those compounds having from up to four or five ethylene groupings, preferably two or three, inc.

Such alcoholate components contain a metal or metalloid element linked to a terminal carbon through an oxygen linkage. These components are made by reacting an element, an alkoxide thereof, or a hydride, with a monoalkyl ether of the lower polyethylene glycol. Thus, sodium metal can be recated with the monomethyl ether of diethylene glycol and will produce an alcoholate reaction product by displacement of the hydrogen of the remaining hydroxyl group. Lithium, potassium, magnesium and calcium metals can also be reacted in similar fashion. Alternatively, the hyrides of these alkali and alkaline earth metals can be employed as starting reactants to make the desired catalyst components. Alternatively, alkoxides of the cited metals or of boron can be employed as starting reactants. Thus, trimethyl "borate" or boron trimethoxide, $B(OCH_3)_3$, can be reacted with a substantial excess of the monomethyl ether of triethylene glycol to provide the boron alkoxide of this compound by reaction at the hydroxy group. In all cases the valence linkages of the metal are fully satisfied by alcoholate groupings. In case of the di- and trivalent metals or metalloids, the catalyst compound is a di- or trialcoholate.

Various techniques for carrying out the process are available. In carrying out the process, by a cyclic type operation, a reaction zone is charged with subdivided solid monosodium lead alloy, and thereafter, is reacted with methyl chloride at reaction conditions. Various modes of supplying the catalyst components are quite effective. Thus, in the most common class of embodiments, an inert liquid hydrocarbon is also charged in somewhat limited proportions, and in such instances the catalyst components can be dissolved in said hydrocarbon. The hydrocarbon when used is usually in proportions of about 1/25 to about 1/4 of the alloy by weight. In other cases, the catalyst can be dissolved in the methyl chloride supply and is thereby fed during the entire course of supply of this methylating reagent.

After the initial charge of alloy, the reactor is sealed except for necessary venting connections. The temperature is raised to, usually, about 65° C. or above, while the system is agitated, and methyl chloride is charged. The methyl chloride in some cases is charged all at one time, and in other cases is fed in over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present, when the feed is "spread out" over a finite period.

The materials thus charged together are then reacted at temperatures, averaging from about 85 to 110° C. Agitation is provided throughout the reaction period, as the reacting system includes solids and volatile liquids. The reaction is continued to completion, requiring from about one hour and less than seven hours, dependent on the configuration of the apparatus, the degree of agitation, and the quantity of alloy to be reacted.

On completion of the reaction, the autoclave and contents are cooled and discharged, and the tetramethyllead is recovered from the lead and alkali metal chloride components of the reaction mass. When small portions of hydrocarbon additive are employed in the synthesis reaction the tetramethyllead is usually accompanied on recovery by said hydrocarbon liquid.

As already noted, the present invention provides high yields, in addition to other benefits. To illustrate the general mode of operation, and the results heretofore obtained, a series of "base line" operations were conducted, showing generally the procedure already mentioned, except that the only additives or catalysts for the process were hydrocarbon aluminum compounds.

In these operations, in each run, an autoclave was charged with 1,000 parts of comminuted monosodium lead alloy, containing 10 weight percent sodium. A mixture of an aluminum type catalyst, dissolved in anhydrous toluene, was then charged, while agitating the contents of the autoclave. The said solution was provided in proportions of about 54 parts tolylene by weight, and the aluminum catalyst was charged in proportions of about 0.24 weight percent aluminum content based on the alloy charge. According to the identity of the aluminum catalysts of course, the weight of the catalyst compound would be varied. Thus, in the case of using methyl aluminum sesquichloride, $(CH_3)_3Al_2Cl_3$, as the aluminum type catalyst, a typical concentration was about 9.26 parts per 1,000 parts of the monosodium lead alloy charged.

The charge thus established was then sealed in the autoclave and preheated to about 95° C., and then methyl chloride was fed to the autoclave interior. The temperature was controlled below about 110° C., and the methyl chloride was fed during a period of less than about 30 minutes in proportions corresponding to 1.7 "theories," or about 370 parts by weight per 1,000 parts of the alloy charged.

Upon completion of the reaction, after additional reaction for a period of approximately two hours, the contents of the autoclave were cooled and removed from the interior. The amount of tetramethyllead produced was determined by its extraction from the reaction mixture, or reaction mass, with a hydrocarbon solvent and by reaction of the tetramethyllead with iodine of an aliquot of the liquid extract, followed by back titration. Alternatively, in some instances, the reaction mass was subjected to steam distillation, for separation of the tetramethyllead from the excess lead solids and sodium chloride component of the reaction mass.

A series of operations as above described was carried out, using the procedure indicated. Using triethyl aluminum as the catalyst, the average yield in a substantial number of operations obtained was about 78 percent, and when using methyl aluminum sesquichloride as a catalyst in comparable concentrations, the average yield was 77 percent. In this series of operations, and in others using the same apparatus and technique, but with significantly decreased catalyst concentration, it was found that the indicated aluminum catalyst concentration level was necessary for reproducible yields approaching or equal to the average yield mentioned. Comparable yields were occasionally obtained at lower concentrations, but were not consistently obtained. Generally, the yield appeared to decrease linearly with the aluminum catalyst concentration below the indicated level, but the most effective aluminum catalyst concentration will vary with different reactors and processing techniques.

The reaction mass attained in the above described base line runs was quite reactive, in that, when portions were exposed to the atmosphere, considerable fuming occurred. The fuming is attributed to the existence in the reaction mass of aluminum hydrocarbon moieties, expressed as AlR. These groups, wherein Al is the monovalent equivalent and R is a hydrocarbon or a hydrogen, are capable of reacting with oxygen and releasing microscopic particles of aluminum oxide. These particles are so fine that they appear as a fog and tend to foul heat exchange surfaces in recovery equipment.

To illustrate the operation of the present invention, the following working examples are given.

*Example 1*

In this operation the binary catalyst system was provided by supplying triethyl aluminum and sodium alcoholate of ethyl ether of triethylene glycol to the reaction. The latter component was made from sodium metal and monoethyl ether of triethylene glycol at room temperature in a reaction medium of anhydrous toluene. An excess of the sodium was provided and the reaction was carried out at room temperature. After a reaction period of about one hour, gas evolution and terminated. The liquid phase, the alcoholate product being dissolved in toluene, was decanted.

The methylation was carried out generally as already described except that a substantially higher proportion of methyl chloride was provided in proportions of about nine times the theoretical requirement. Triethyl aluminum was charged in proportions of about 1.1 weight percent of the alloy, corresponding to an aluminum concentration of 0.25 weight percent of the alloy. The sodium alkoxide of ethyl ether of triethylene glycol was provided in proportions of about 1.27 weight percent based on the sodium lead alloy charged, or about 0.0094 gram mole per 100 grams of alloy. The mole ratio of the sodium alkoxide component to aluminum component was almost exactly 1:1. The methylation reaction proceeded smoothly for a total reaction period of about two hours at about 90° C. A yield of 93 percent tetramethyllead was obtained. In addition, the reacted mixture was substantially free of any fuming tendency.

In contrast, when several operations were carried out using the above described reaction conditions but only the triethyl aluminum was used as catalyst, an average yield of 69 percent was obtained. When a further series of operations were carried out, but the triethyl aluminum concentration was doubled, the average yield was about 82 percent. The present invention, then, provides high yields as well as relatively non-reactive reaction masses.

*Example 2*

In the following operation, the catalyst included triethyl aluminum and boron trialcoholate of diethylene glycol methyl ether. This catalyst component was prepared by reacting boron trimethoxide, $B(OCH_3)_3$, with a substantial excess of monomethyl ether of diethylene glycol. Reaction was continued for about one hour, and then the methyl alcohol released, and excess monomethyl ether of diethylene glycol was distilled off, leaving a colorless reaction product, the boron trialcoholate component, $B(OC_2H_4OC_2H_4OCH_3)_3$. This component and triethyl aluminum were charged to the reaction bomb in proportions such that the ratio of an atom equivalent of baron to the aluminum was 0.12:1. The concentration of the aluminum in the triethyl aluminum was approximately 0.25 weight percent of the alloy.

Reaction was carried out as in Example 1 above, and a yield of 85.1 percent tetramethyllead was obtained and the reaction mixture was substantially free of any fuming tendency.

The following table illustrates further examples showing further variations of the present invention.

| Ex. | Aluminum Catalyst | | Alcoholate Catalyst | |
|---|---|---|---|---|
| | Compound | Concentration, Aluminum, Percent of Alloy | Identity | Proportions, Equivalents/Atom Al |
| 3 | Ethyl aluminum sesquichloride. | 0.25 | Ethyl ether of triethylene glycol sodium alcoholate. | 0.5 |
| 4 | Methyl aluminum sesquichloride. | 0.07 | Hexyl ether of diethylene glycol magnesium dialcoholate. | 1.4 |
| 5 | Tri-isobutyl aluminum. | 0.15 | Propyl ether of tetraethylene glycol boron trialcoholate. | 0.07 |
| 6 | Trihexyl aluminum. | 0.20 | Octyl ether of ethylene glycol sodium alcoholate. | 1 |
| 7 | Diethyl butyl aluminum. | 0.28 | Butyl ether of tetraethylene glycol calcium dialcoholate. | 1.8 |
| 8 | Diethyl aluminum hydride. | 0.23 | Methyl ether of tetra ethylene glycol potassium alcoholate. | 1.7 |

The foregoing illustrates in part permissive variations in the catalyst components and combinations. Further variation is of course possible. Thus, instead of the alcoholate compounds explicitly cited and illustrated, selection of this component can be made from the following:

Methyl ether of diethylene glycol sodium alcoholate,
Butyl ether of diethylene glycol potassium alcoholate,
Hexyl ether of tetraethylene glycol calcium dialcoholate,
Methyl ether of triethylene glycol boron trialcoholate,
Butyl ether of diethylene glycol boron trialcoholate,
Propyl ether of tetraethylene glycol lithium alcoholate,
and numerous other alcoholate compounds of the type illustrated herein. When members selected from the above illustrative list are substituted for the alcoholate components in the preceding examples, similar good results will be obtained.

What is claimed is:
1. The process of manufacture of tetramethyllead comprising reacting sodium lead alloy with methyl chloride and in the presence of a catalyst including
    (a) an alkyl aluminum compound selected from the group of consisting of aluminum trialkyls, and alkyl aluminum chlorides and
    (b) an alkyl ether polyethylene glycol alcoholate of an element selected from the group consisting of sodium, lithium, potassium, magnesium, calcium, and boron, said polyethylene glycol having from one to five ethylene groups.
2. The process of manufacture of tetramethyllead comprising reacting sodium lead alloy with methyl chloride and in the presence of a catalyst including
    (a) an alkyl aluminum compounds selected from the group consisting of aluminum trialkyls and alkyl aluminum chlorides, in proportions providing an aluminum content of from about 0.04 to 0.5 weight percent of the alloy, and
    (b) an alkyl ether polyethylene glycol alcoholate of an element selected from the group consisting of sodium, lithium, potassium, magnesium, calcium, and boron, and said alcoholate being in proportions providing from 0.05 to 2 monoatomic element equivalents per atom of aluminum in the alkyl aluminum compound of (a), said polyethylene having from one to five ethylene groups.
3. The process of manufacture of tetramethyllead comprising reacting sodium lead alloy with methyl chloride and in the presence of a catalyst including
    (a) triethylaluminum in proportions providing aluminum in a concentration of 0.1 to 0.3 weight percent of the alloy, and
    (b) ethyl ether triethylene glycol sodium alcoholate in proportions of about 0.7 to 1.5 equivalents per atom of aluminum in (a).
4. The process of manufacture of tetramethyllead comprising reacting sodium lead alloy with methyl chloride and in the presence of a catalyst including
    (a) triethylaluminum in proportions providing aluminum in a concentration of 0.1 to 0.3 weight percent of the alloy, and
    (b) methyl ether diethylene glycolate boron trialcoholate.
5. The process of manufacture of tetramethyllead comprising reacting sodium lead alloy with methyl chloride and in the presence of a catalyst including
    (a) an alkyl aluminum compound selected from the group consisting of aluminum trialkyls, and alkyl aluminum chlorides, and

(b) an alkyl ether polyethylene glycol sodium alcoholate wherein said polyethylene glycol has from one to five ethylene groups.

6. The process of manufacture of tetramethyllead comprising reacting sodium lead alloy with methyl chloride and in the presence of a catalyst including
   (a) an alkyl aluminum compound selected from the group consisting of aluminum trialkyls, and alkyl aluminum chlorides, and
   (b) an alkyl ether polyethylene glycol boron alcoholate wherein said polyethylene glycol has from one to five ethylene groups.

References Cited by the Examiner
UNITED STATES PATENTS

| | | | |
|---|---|---|---|
| 3,049,558 | 8/1962 | Cook et al. | 260—437 |
| 3,072,694 | 1/1963 | Tullio | 260—437 |

TOBIAS E. LEVOW, *Primary Examiner.*